July 28, 1959 R. L. JAESCHKE 2,896,758
MAGNETIC CLUTCH
Filed Sept. 24, 1954
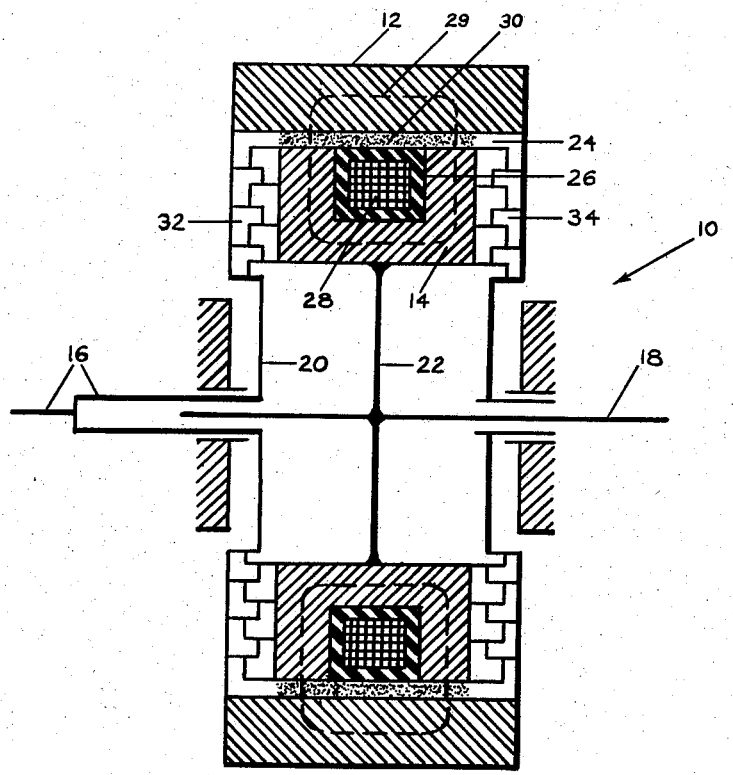
INVENTOR.
RALPH L. JAESCHKE
BY
ATTORNEYS

2,896,758
MAGNETIC CLUTCH

Ralph L. Jaeschke, Kenosha, Wis., assignor to Eaton Manufacturing Company, Cleveland, Ohio, a corporation of Ohio Application September 24, 1954, Serial No. 458,088

6 Claims. (Cl. 192—21.5)

The present invention relates to an electromagnetic apparatus employing magnetic couplings. More particularly, the present invention relates to a magnetic material utilizable in a gap between a pair of relatively movable clutch members to facilitate or enhance the coupling therebetween. The present invention will be described with reference to an electromagnetic clutch, it being understood that the principles involved apply equally to electromagnetic brakes, dynamometers, and the like apparatus.

Broadly, the present invention comprehends the provision of a magnetic material in a form including a multitude of finely divided particles each of which consists of a magnetic material alloyed or infiltrated with another material to render the particles hard, impervious and wear-resistant and thereby prevent any undesirable sintering or agglomeration thereof.

In the past, it has been experienced that in a clutch apparatus having a pair of relatively movable members separated to form an air gap and to receive magnetic material in the space between the members, an undesirable sintering or agglomeration of the pulverized magnetic material may take place whenever the clutch is heavily loaded for extended periods and wherein the temperature of the clutch rises considerably. The sintering adversely affects performance of the clutch and results in clogging or jamming of the clutch members or in decreased output torque due to inactivation of otherwise utilizable magnetic material. Prior to this invention, it had been conceived to minimize the sintering and adverse effects thereof by the addition of certain anti-sintering additives to the magnetic material. Suitable additives have the properties of being chemically inert, stable at high temperatures, and are non-hygroscopic. Although the use of these prior anti-sintering materials has in large measure eliminated sintering, it is not completely effective under all conditions of operation of the clutch. Under most severe and heavy duty operation, sintering of magnetic material may take place notwithstanding the presence of additives to prevent it.

It is accordingly an object of the present invention to provide a magnetic material, utilizable in electromagnetic clutches and the like apparatus, that is anti-sintering under virtually all conditions of operation.

It is another object of the present invention to provide a magnetic material, utilizable in electromagnetic clutches and the like apparatus, that is thermally and chemically stable and non-hygroscopic to prevent breakdown thereof under virtually all conditions of operation.

It is another object of the present invention to provide a magnetic material, utilizable in electromagnetic clutches and the like apparatus, that is durable and impervious to physical or chemical attack.

It is another object of the present invention to provide a magnetic material, utilizable in electromagnetic clutches and the like apparatus, comprising ferromagnetic particles which are thermally and chemically stable, non-hygroscopic and impervious to physical attack.

It is another object of the present invention to provide a magnetic material, utilizable in electromagnetic clutches and the like apparatus, comprising a plurality of magnetic particles, each of which includes a ferromagnetic material alloyed with another material and has magnetic properties substantially identical to particles of material utilized in such or similar clutches.

Other objects and advantages of the present invention will become apparent from a perusal of the following detailed description taken in connection with the accompanying drawing in which:

The single figure depicts in axial section a magnetic clutch or the like apparatus incorporating the present invention.

In the past, it had been observed that the addition of aluminum powder to magnetic material had the effect of minimizing sintering of the material and a more complete analysis revealed that the salutary effect on the magnetic material is caused by the oxide of aluminum that is hard and impervious, forming on the surface of the magnetic particles. It has been learned that ferromagnetic particles of a magnetic material may be treated by diffusing the particles with aluminum powder in a very high vacuum and at elevated temperature and that the resultant product comprises particles of ferromagnetic material, each completely diffused or alloyed with aluminum and forming a ferromagnetic-aluminum alloy that is stable thermally and chemically, physically hard and impervious, non-hygroscopic and with good magnetic characteristics so as to have properties similar to the particles not diffused or alloyed. It is also significant that such particles are so hard and impervious physically that they are not broken apart or subdivided due to wear or abrasion with other particles or other elements of the apparatus. In general, a magnetic material comprising such particles overcomes all properties undesirable in presently known magnetic materials for clutches and the like apparatus and is not subject to sintering or other adversities of such materials.

In exercising the present invention, it is conceivable to provide particles having only their outer portions diffused so as to encompass and protect that portion therewithin not so diffused.

Referring now more particularly to the drawing for a more detailed description of the present invention, 10 represents generally an electromagnetic clutch, brake, dynamometer or the like apparatus having a pair of relatively rotatable annular input and output members 12 and 14 mounted respectively on input and output shafts 16 and 18 through a casing 20 and a spider member 22. It is to be understood that the shafts 16 and 18 are interchangeable in function, that is, either may be the input or output as in a clutch apparatus and that either may be a stationary or oscillatable element as in a brake or dynamometer apparatus.

Members 12 and 14 are separated by an air gap 24 and output member 14 is recessed at 26 to receive an annular coil 28 for producing a circulating magnetic field 29. Disposed in air gap 24 between input and output members 12 and 14 is a magnetic material 30 responsive to the flux circulated by coil 28 to assume the space of the gap of highest flux density. Labyrinth seals 32 and 34 are provided for preventing escape of magnetic material 30 from between members 12 and 14.

According to the present invention, the magnetic material 30 preferably comprises particles of ferromagnetic material of mesh between 230 and 75, diffused with aluminum as described above, to provide a ferromagnetic-aluminum alloy particle. Any of various ferromagnetic materials such as stainless steel, carbonyl iron, or pure iron is suitable, but pure iron is preferred as a magnetic material because of its either low cost and/or higher magnetic saturation value as compared with said other utilizable materials; and the aluminum powder employed in the present invention may be commercially available aluminum powder such as is used in the making of aluminum paints.

Any of various methods may be employed in preparing magnetic material for use in the clutch of the present invention. Several methods about to be described are suitable and are set forth as being exemplary methods only and not as exclusive methods, it being understood that any other suitable method may be employed without deviating from the spirit and scope of the invention in the magnetic clutch herein.

One method of producing the diffused ferromagnetic-aluminum material, includes the steps of first thoroughly mixing a predetermined quantity of selected ferromagnetic particles, such as pure iron having a mesh size of preferably between 230 and 75 mesh with a predetermined quantity of commercially available aluminum powder. The iron particles and aluminum powder should preferably be in the proportions by weight of approximately 90% to 10% and by volume of approximately 50–50. Next, the mixture of iron and aluminum is placed in a suitable receptacle in a vacuum furnace under 1 micron vacuum at 1600° F. and retained therein under such conditions for a suitable period of time to provide for a desired diffusion of the metal powders to produce particles of iron-aluminum alloy or iron particles alloyed with aluminum powder. Subsequently, after the removal of the alloyed particles from the furnace, the resultant powder is placed in a ball mill so as to free any of the particles that may have cohered with other of the particles. Because of the effective alloying and diffusion of the iron and aluminum, the particle size of the resultant powder is substantially identical with the iron particle size used in the production of said powder.

In another method of producing the ferromagnetic-aluminum material, a mixture of iron and aluminum is placed in a suitable crucible and heated to a molten state. A rotatable disk having a large number of holes or perforations of about the size of the desired magnetic particles is rotated in a horizontal plane below which is water or a water spray. The molten metal is poured from the crucible through a small hole onto the perforated rotating disk which by its rotation interrupts the stream of metal and allows small globules of molten metal to pass through the disk and be admitted to the chamber below and to be cooled to a solid state by the water or water spray.

In another method of producing the ferromagnetic-aluminum material, commonly called the atomization method, a ferromagnetic-aluminum alloy rod of the consistency desired for the particles of magnetic material is heated as by a gas torch, induction furnace, or some other suitable means and is then atomized into a spray of fine particles by a stream of a suitable gas. The particles are projected into a water spray and cooled thereby to a molten state.

In another method of producing the ferromagnetic-aluminum material, an alloy billet of a consistency of the desired particles is ground or disintegrated by a grinder having a bite producing particles of the size desired. Emery grinders have been found satisfactory but metal knife grinders are considered preferable. A disadvantage of this method is that the particles produced have sharp, jagged edges and a ball milling process may be required to round off the edges of the particle.

In still another method of producing the ferromagnetic-aluminum material, commonly called the carbonyl or evaporation system, a wire or small billet of ferromagnetic-aluminum alloy of the desired consistency is placed in an evacuated sphere. The wire or billet is heated to a molten state in some suitable manner as by an electrical current passed therethrough. The heat is applied so intensively as to evaporate the metal. The sphere is then allowed to cool and in the cooling process small spherical globules of metal are condensed on the surface of the sphere which in the solid state comprise the utilizable magnetic material.

In operation of the clutch, the annular coil 28 is energized to provide a circulating magnetic field linking the members 12 and 14. The magnetic field traverses the air gap 24 between the members 12 and 14 and by virtue of magnetization of material 30, a coupling is provided between members 12 and 14. It is to be understood that the coil 28 is variably energizable to provide variable degrees of coupling between members 12 and 14 with consequent relative movement between these members. In the event of relative movement between input and output members, considerable friction takes place among particles of the material 30 and as stated hereinabove under heavy, severe operation of the clutch, alloyed particles of material 30 may tend to sinter or fuse together into large masses. Particles of material treated according to the present invention, however, have no tendency to sinter since they are usually homogeneous throughout and are stable thermally at temperatures attained even under heavy operating conditions to prevent any possible fusion and unification of particles.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In a magnetic coupling comprising a pair of relatively movable input and output members separated to form a gap means for generating a magnetic field linking said members, magnetic material located in said gap, said magnetic material consisting of particles, each of said particles having at least a portion thereof consisting entirely of an alloy of only aluminum and iron.

2. In a magnetic coupling comprising a pair of relatively movable input and output members separated to form a gap therebetween, means providing a magnetic field linking said gap, magnetic material in said gap, said material comprising particles, each of which has a portion thereof consisting of iron with the remaining portion being an iron-aluminum alloy.

3. In a magnetic coupling comprising a pair of relatively movable input and output members separated to form a gap therebetween, means providing a magnetic field linking said gap, magnetic materials in said gap comprising a plurality of particles, the composition of each particle being iron alloyed with aluminum in respective approximate gravimetric proportions of 90% to 10%.

4. In a magnetic coupling comprising a pair of relatively movable input and output members separated to form a gap therebetween, means providing a magnetic field linking said gap, magnetic material in said gap comprising a plurality of particles, the composition of each particle being iron alloyed with aluminum in respective approximate volumetric proportions of 50% and 50%.

5. In a magnetic coupling comprising a pair of relatively movable input and output members separated to form a gap therebetween, means providing a magnetic field linking said gap, magnetic material in said gap comprising a plurality of magnetic particles, said particles being of ferromagnetic composition and consisting of iron substantially completely diffused with approximately 10%, by weight, of aluminum to form an alloy thereof.

6. In combination with a magnetic clutch apparatus including a pair of relatively rotatable clutch members and a magnetic field linking said members, magnetic material located between said members and comprising a plurality of magnetic particles the composition of each of said particles being an alloy of iron and aluminum in respective approximate gravimetric proportions of 90% to 10%.

References Cited in the file of this patent

UNITED STATES PATENTS

| | | |
|---|---|---|
| 2,149,782 | Lucas | Mar. 7, 1939 |
| 2,718,157 | Schaub | Sept. 20, 1955 |
| 2,726,952 | Morgan | Dec. 13, 1955 |

FOREIGN PATENTS

| | | |
|---|---|---|
| 526,070 | Belgium | July 28, 1954 |
| 677,726 | Great Britain | Aug. 20, 1952 |